(12) United States Patent
Ho et al.

(10) Patent No.: US 6,284,842 B1
(45) Date of Patent: Sep. 4, 2001

(54) COUPLING OF BLENDS OF α-OLEFIN/ VINYL AROMATIC MONOMER OR HINDERED ALIPHATIC VINYL MONOMER INTERPOLYMERS WITH POLYOLEFINS

(75) Inventors: Thoi H. Ho, Lake Jackson, TX (US); Robert H. Terbrueggen, South Pasadena, CA (US); H. Craig Silvis; Clark H. Cummins, both of Midland, MI (US); Michael J. Mullins, Lake Jackson, TX (US)

(73) Assignee: The Dow Chemical company, Midland, MI (US)

( * ) Notice: Subject to any disclaimer, the term of this patent is extended or adjusted under 35 U.S.C. 154(b) by 0 days.

(21) Appl. No.: 09/140,900

(22) Filed: Aug. 26, 1998

Related U.S. Application Data

(60) Provisional application No. 60/057,341, filed on Aug. 27, 1997, provisional application No. 60/057,713, filed on Aug. 27, 1997, and provisional application No. 60/057,582, filed on Aug. 27, 1997.

(51) Int. Cl.$^7$ ....................................................... C08F 8/30
(52) U.S. Cl. ......................... 525/194; 525/240; 525/241; 525/333.5; 525/333.8; 525/351
(58) Field of Search ................................... 525/351, 194, 525/240, 241

(56) References Cited

U.S. PATENT DOCUMENTS

| | | |
|---|---|---|
| 3,058,944 | 10/1962 | Breslow et al. . |
| 3,203,936 | 8/1965 | Breslow et al. . |
| 3,203,937 | 8/1965 | Breslow et al. . |
| 3,282,864 | 11/1966 | Best et al. . |
| 3,298,975 | 1/1967 | Feild et al. . |
| 3,336,268 | 8/1967 | Cox . |
| 3,341,480 | 9/1967 | Feild et al. . |
| 3,389,198 | 6/1968 | Taber et al. . |
| 3,530,108 | 9/1970 | Oppenlander et al. . |
| 4,352,892 | 10/1982 | Lohmar . |
| 4,579,905 | 4/1986 | Krabbenhoft . |
| 4,694,025 | 9/1987 | Park . |
| 4,714,716 | 12/1987 | Park . |

FOREIGN PATENT DOCUMENTS

| | | |
|---|---|---|
| 797917 | 10/1968 | (CA) ..................................... 401/51 |
| 1024296 | 1/1978 | (CA) . |
| 1219389 | 3/1987 | (CA) . |
| 1080619 | 8/1967 | (EP) . |
| 0 702 032 A2 | 3/1996 | (EP) . |
| 2 205 103 A | 11/1988 | (GB) . |
| 46/31756 | 9/1971 | (JP) . |
| 96/07681 | 3/1996 | (WO) . |

OTHER PUBLICATIONS

R. A. Abramovitch, "Polar Radicals in Aromatic Substitution", *Intra–Science Chemistry Reports,* pp. 211–218, (1969).

R. A. Abramovitch, G. N. Knaus, M. Pavlin, and W. D. Holcomb, "Reaction of Sulphonyl Azides with Unstrained Olefins", *J. Chem. Soc.,* pp. 2169–2172, (1974).

R. A. Abramovitch, T. Chellathurai, W. D. Holcomb, I.T. McMaster, and D. P. Vanderpool, "Intramolecular Insertion of Arylsulfonylnitrenes into Aliphatic Side Chains[1]", *J. Org. Chem.,* vol. 42, No. 17, pp. 2920–2926, (1977).

R. A. Abramovitch, S. B. Hendi, and A. O. Kress, "Pyrolysis of Phenylalkylsulphonyl Azides and 2–phenethyl Azidoformate. Selectivity of Sulphonylnitrenes and Contrast between Sulphonyl– and Carbonyl–nitrenes", *J. Chem. Soc., Chem. Commun.,* pp. 1087–1088, (1981).

R. A. Abramovitch, M. Ortiz, and S. P. McManus, "Reaction of Aromatic Sulfonyl Azides with Dienes", *J. Org. Chem.,* vol. 6, pp. 330–335. (1981).

H. Radusch, J. Ding, and M. Schulz, "Chemical coupling of polystyrene and polybutadiene in melt mixtures by using an organic sulfonylazide", *Die Angewandte Makromolekulare Chemie,* vol. 204, pp. 177–189, (1993).

N. Takashima, Y. Nakayama, "The Processings of Crosslinked Plastics", *Kogaku Kogyo (Chemistry Industry),* pp. 34(378)–39(383), (1969).

D. S. Breslow, M. F. Sloan, N. R. Newburg, and W. B. Renfrow, "Thermal Reactions of Sulfonyl Azides", *J. Amer. Chem. Soc.,* vol. 91, pp. 2273–2279, (1969).

M. Xanthos, "Interfacial Agents for Multiphase Polymer Systems: Recent Advances", *Polymer Engineering and Science,* vol. 28, No. 21, pp. 1392–1400, (1988).

Derwent Chemical Abstract No. 77–02552Y of JP 51134762 A.

P. Mapleston, "PP foam sheet emerges as a contender for a range of applications", *Modern Plastics,* pp. 110–111, (1997).

*Primary Examiner*—Bernard Lipman

(57) ABSTRACT

The invention includes a process of preparing a coupled polymer blend comprising heating an admixture containing (1) a polymer blend containing: (A) from 1 to 99 weight percent of one ore more α-olefin/hindered vinyl monomer substantially random interpolymers, each having been made from monomer components comprising: (1) from 0.5 to 65 mole percent of either (a) at least one vinyl aromatic monomer, or (b) at least one hindered aliphatic vinyl monomer, or (c) a combination of at least one vinyl aromatic monomer and at least one hindered aliphatic vinyl monomer; and (2) from 35 to 99.5 mole percent of at least one aliphatic α-olefin having from 2 to 20 carbon atoms; and (B) from 99 to 1 weight percent of one or more homopolymers or copolymers made from monomer components comprising aliphatic α-olefins having from 2 to 20 carbon atoms, or aliphatic α-olefins having from 2 to 20 carbon atoms and containing polar groups; and (2) a coupling amount of at least one poly(sulfonyl azide) to at least the decomposition temperature of the poly(sulfonyl azide) for a period sufficient for decomposition of at least 80 weight percent of the poly(sulfonyl azide) and sufficient to result in a coupled polymer blend having less than 2 weight percent gel.

20 Claims, No Drawings

COUPLING OF BLENDS OF α-OLEFIN/ VINYL AROMATIC MONOMER OR HINDERED ALIPHATIC VINYL MONOMER INTERPOLYMERS WITH POLYOLEFINS

This application claims the benefit of U.S. Provisional Application No. 60/057,341, filed Aug. 27, 1997; U.S. Provisional Application No. 60/057,713, filed Aug. 27, 1997; and U.S. Provisional Application No. 60/057,582, filed Aug. 27, 1997 which are incorporated herein by reference in their entireties.

The present invention pertains to blends of interpolymers made from monomer components comprising at least one α-olefin and at least one aromatic vinyl or vinylidene monomer and/or at least one hindered aliphatic vinyl or vinylidene monomer and/or at least one cycloaliphatic vinyl or vinylidene monomer with olefinic polymers, especially such blends which are coupled.

BACKGROUND OF THE INVENTION

Interpolymers of the class which include α-olefin/ hindered vinyl monomer substantially random interpolymers and include materials such as α-olefin/vinyl aromatic monomer interpolymers are known in the art and offer a range of material structures and properties which makes them useful for varied applications, such as compatibilizers for blends of polyethylene and polystyrene as described in U.S. Pat. No. 5,460,818.

As described by D'Anniello et al. (Journal of Applied Polymer Science, Volume 58, pages 1701–1706 (1995)), such interpolymers can show good elastic properties and energy dissipation characteristics. Alternatively, certain of the interpolymers are useful in adhesive systems, as illustrated for instance in U.S. Pat. No. 5,244,996, issued to Mitsui Petrochemical Industries Ltd.

It would be desirable to provide improvements in processability or performance without the addition of additives commonly used to improve properties of the interpolymers or enhance properties that can be achieved by using additives and would be more desirable to achieve combinations of properties not attainable using blends of polymers alone. Alternatively, characteristics of a blend produced to obtain certain desirable characteristics would advantageously be further improved by practice of the present invention. Characteristics which would desirably improve would include at least one of low temperature toughness, mechanical strength, heat resistance and melt processability, preferably heat resistance, Coupling of polymers results in rheology modification of the polymer. As used herein, the term "rheology modification" means change in melt viscosity of a polymer as determined by dynamic mechanical spectroscopy. Preferably the melt strength increases while maintaining the high shear viscosity (that is viscosity measured at a shear of 100 rad/sec by DMS) so that a polymer exhibits more resistance to stretching during elongation of molten polymer at low shear conditions (that is viscosity measured at a shear of 0.1 rad/sec by DMS) and does not sacrifice the output at high shear conditions.

Use of poly(sulfonyl azide)s to react with polymers is known for instance in The teachings of U.S. Pat. Nos. 3,058,944; 3,336,268; and 3,530,108 include the reaction of certain poly(sulfonyl azide) compounds with isotactic polypropylene or other polyolefins by nitrene insertion into C—H bonds. The product reported in U.S. Pat. No. 3,058, 944 is crosslinked. The product reported in U.S. Pat. No. 3,530,108 is foamed and cured with cycloalkane-di(sulfonyl azide) of a given formula. In U.S. Pat. No. 3,336,268 the resulting reaction products are referred to as "bridged polymers" because polymer chains are "bridged" with sulfonamide bridges. The disclosed process includes a mixing step such as milling or mixing of the sulfonylazide and polymer in solution or dispersion then a heating step where the temperature is sufficient to decompose the sulfonylazide (100° C. to 225° depending on the azide decomposition temperature). The starting polypropylene polymer for the claimed process has a molecular weight of at least about 275,000. Blends taught in U.S. Pat. No. 3,336,268 have up to about 25 percent ethylene propylene elastomer.

Similarly, the teachings of Canadian patent 797,917 (family member of NL 6,503,188) include rheology modification using from about 0.001 to 0.075 weight percent polysulfonyl azide to modify homopolymer polyethylene and its blend with polyisobutylene.

It would also be desirable to use a polymer of enhanced melt strength in a foaming process preferably to achieve at least one of smaller cell diameter, homogeneous cell diameter distribution, lower foam density, higher tensile and compressive strength, higher tensile or compressive toughness. Preferably, the polymer would have at most little high shear viscosity increase over a corresponding polymer of the same chemical composition, but not modified to obtain the enhanced melt strength, e.g. the starting material polymer, so that it would have smaller processing characteristics as the unmodified polymer.

SUMMARY OF THE INVENTION

It has been found that blends of interpolymers made from monomer components comprising at least one α-olefin and at least one aromatic vinyl monomer and/or at least one hindered aliphatic vinyl monomer and/or at least one cycloaliphatic vinyl monomer with olefinic polymers, said blends having been heated with at least one poly(sulfonyl azide) at least to the decomposition temperature of the poly(sulfonyl azide), advantageously have improvements in at least one of low temperature toughness, mechanical strength, heat resistance or processability, preferably heat resistance.

This improvement is believed to result from the poly (sulfonyl azide) reacting with more than one polymer chain to connect them, referred to herein as "coupling" and the poly(sulfonyl azide), as a "coupling agent." Coupling results in and is measured by rheology modification.

Preferably, blends of the invention having their rheology modified by treatment with poly(sulfonyl azide) coupling agents advantageously have increased melt strength useful in foaming.

The invention includes a process of preparing a coupled polymer blend comprising heating an admixture containing
(1) a polymer blend containing:
(A) from 1 to 99 weight percent based on entire composition of one or more α-olefin/hindered vinyl monomer substantially random interpolymers, each having been made from monomer components comprising:
  (1) from 0.5 to 65 mole percent of either
    (a) at least one vinyl aromatic monomer, or
    (b) at least one hindered aliphatic vinyl monomer, or
    (c) a combination of at least one vinyl aromatic monomer and at least one hindered aliphatic monomer; and
  (2) from 35 to 99.5 mole percent of at least one aliphatic α-olefin having from 2 to 20 carbon atoms; and (B) from 99 to 1 weight percent of one or more homopolymers or copolymers made from monomer components comprising aliphatic α-olefins having from 2 to 20 carbon atoms, or aliphatic α-olefins having from 2 to 20 carbon atoms and containing polar groups; and (2) a coupling amount of at least one poly(sulfonyl azide) to at least the decomposition temperature of the poly(sulfonyl azide) for a period sufficient for decomposition of at least about 80 weight percent of the poly(sulfonyl azide) and sufficient to result in a coupled polymer blend having less than about 2 weight percent gel. Preferably component (A) is a substantially random interpolymer made from styrene and ethylene, or styrene, ethylene and at least one other α-olefin containing from 3 to 8 carbon atoms; and component (B) is a homopolymer made from ethylene or propylene, or a copolymer made from ethylene and/or propylene and at least other α-olefin containing from 4 to 8 carbon atoms; or a terpolymer of ethylene, propylene and at least one of 4-methyl pentene, butene-1, hexene-1 or octene-1. The poly(sulfonyl azide) and blend preferably react at a temperature which is at least greater than the first temperature, at least the decomposition temperature of the poly(sulfonyl azide) and greater than about 150° C. More preferably the poly(sulfonyl azide) and blend are mixed at a first temperature which is at least the melting point of the lowest melting component of the blend and after mixing react at a second temperature which is at least greater than the first temperature, is at least the decomposition temperature of the poly(sulfonyl azide) and is greater than about 185° C.

Further, the invention includes any composition formed by a process of the invention, especially a composition comprising a reaction product obtainable by heating an admixture containing (1) a polymer blend containing:

(A) from 1 to 99 weight percent of one or more α-olefin/hindered vinyl monomer substantially random interpolymers, each having been made from monomer components comprising:
  (1) from 0.5 to 65 mole percent of either
    (a) at least one vinyl aromatic monomer, or
    (b) at least one hindered aliphatic vinyl monomer, or
    (c) a combination of at least one vinyl aromatic monomer and at least one hindered aliphatic vinyl monomer; and
  (2) from 35 to 99.5 mole percent of at least one aliphatic α-olefin having from 2 to 20 carbon atoms; and
(B) from 99 to 1 weight percent of one or more homopolymers or copolymers made from monomer components comprising aliphatic α-olefins having from 2 to 20 carbon atoms, or aliphatic α-olefins having from 2 to 20 carbon atoms and containing polar groups; and (2) a coupling amount at least one poly(sulfonyl azide) to at least the decomposition temperature of the poly(sulfonyl azide) for a period sufficient for decomposition of at least about 80 weight percent of the poly(sulfonyl azide).

The invention also includes any an article which comprises a composition of the invention. Preferably the article is formed from a melt of the composition. More preferably it is formed by a melt process, most preferably the article is calendared, cast and blown sheet, film, compression and injection molded part, fiber, modifier for bitumen or asphalt compositions, or a component in a hot melt or pressure sensitive adhesive system or foam.

DETAILED DESCRIPTION OF THE INVENTION

The term "interpolymer" is used herein to indicate a polymer wherein at least two different monomers are polymerized to make the interpolymer.

The term "copolymer" as employed herein means a polymer wherein at least two different monomers are polymerized to form the copolymer.

The term "mer(s)" means the polymerized unit of the polymer derived from the indicated monomer(s).

The term "monomer residue" or "polymer units derived from" means that portion of the polymerizable monomer molecule which resides in the polymer chain as a result of being polymerized with another polymerizable molecule to make the polymer chain.

The term "substantially random" in the substantially random interpolymer resulting from polymerizing one or more α-olefin monomers and one or more vinyl or vinylidenearomatic monomers or hindered aliphatic or cycloaliphatic vinyl or vinylidene monomers, and optionally, with other polymerizable ethylenically unsaturated monomer(s) as used herein means that the distribution of the monomers of said interpolymer can be described by the Bernoulli Statistical model or by a first or second order Markovian statistical model, as described by J. C. Randall in *POLYMER SEQUENCE DETERMINATION, Carbon-13 NMR Method,* Academic Press New York, 1977, pp. 71–78. Preferably, the substantially random interpolymer resulting from polymerizing one or more α-olefin monomers and one or more vinyl aromatic monomer, and optionally, with other polymerizable ethylenically unsaturated monomer(s) does not contain more than 15 percent of the total amount of vinyl aromatic monomer in blocks of vinyl aromatic monomer of more than 3 units. More preferably, the interpolymer was not characterized by a high degree of either isotacticity or syndiotacticity. This means that in the carbon$^{-13}$ NMR spectrum of the substantially random interpolymer the peak areas corresponding to the main chain methylene and methine carbons representing either meso diad sequences or racemic diad sequences should not exceed 75 percent of the total peak of the main chain methylene and methine carbons.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Polymers used as starting materials in the practice of the invention are blends of polymers. Each polymer in the blend is a polyolefin. At least one of the polyolefins is interpolymers made from monomer components comprising at least one α-olefin and at least one aromatic vinyl monomer and/or at least one hindered aliphatic vinyl monomer and/or at least one cycloaliphatic vinyl monomer (A) and at least one other polymer is a different polyolefin (B). There is preferably a phase separated polymer composition containing distinct hard and soft segments, where the hard segments reinforce the soft phase, but it is not crosslinked into a network, that is the composition is still thermoplastic. In blends there are advantageously improvements of at least one physical property such as impact strength, stiffness, heat resistance, low temperature toughness, mechanical strength, scratch and mar resistance, processability, and the like of these blends as compared to blends of the same components not treated by the process of the invention.

The interpolymers suitable as component (A) for the blends comprising the present invention include substantially random interpolymers prepared by polymerizing one or more α-olefin monomers with one or more vinyl aromatic monomers and/or one or more hindered aliphatic or cycloaliphatic vinyl monomers, and optionally with other polymerizable ethylenically unsaturated monomer(s).

Suitable α-monomers include for example, α-olefin monomers containing from 2 to 20, preferably from 2 to 12, more preferably from 2 to 8 carbon atoms. Preferred such monomers include ethylene, propylene, butene-1, 4-methyl-1-pentene, hexene-1 and octene-1. Most preferred are ethylene or a combination of ethylene with $C_{3-6}$ α-olefins. These α-olefins do not contain an aromatic moiety.

Other optional polymerizable ethylenically unsaturated monomer(s) include strained ring olefins such as norbornene and $C_{1-10}$ alkyl or $C_{6-10}$ aryl substituted norbornenes, with an exemplary interpolymer being ethylene/styrene/norbornene.

Suitable vinyl aromatic monomers which can be employed to prepare the interpolymers employed in the blends include, for example, those represented by the following formula:

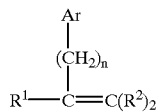

wherein $R^1$ is selected from the group of radicals consisting of hydrogen and alkyl radicals containing from 1 to 4 carbon atoms, preferably hydrogen or methyl, each $R^3$ is independently selected from the group of radicals consisting of hydrogen and alkyl radicals containing from 1 to 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to 6, preferably from zero to 2, most preferably zero. Exemplary vinyl aromatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof. Preferred monomers include styrene, a-methyl styrene, the lower alkyl- ($C_1$–$C_4$) or phenyl-ring substituted derivatives of styrene, such as for example, ortho-, meta-, and para-methylstyrene, the ring halogenated styrenes, para-vinyl toluene or mixtures thereof, and the like. A more preferred aromatic vinyl monomer is styrene.

By the term "hindered aliphatic or cycloaliphatic vinyl or vinylidene compounds", it is meant addition polymerizable vinyl or vinylidene monomers corresponding to the formula:

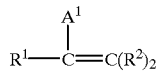

wherein $A^1$ is a sterically bulky, aliphatic or cycloaliphatic substituent of up to 20 carbons, $R^1$ is selected from the group of radicals consisting of hydrogen and alkyl radicals containing from 1 to 4 carbon atoms, preferably hydrogen or methyl; each $R^2$ is independently selected from the group of radicals consisting of hydrogen and alkyl radicals containing from 1 to 4 carbon atoms, preferably hydrogen or methyl; or alternatively $R^1$ and $A^1$ together form a ring system. By the term "sterically bulky" is meant that the monomer bearing this substituent is normally incapable of addition polymerization by standard Ziegler-Natta polymerization catalysts at a rate comparable with ethylene polymerizations. Preferred aliphatic or cycloaliphatic vinyl or vinylidene monomers are those in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred hindered aliphatic or cycloaliphatic vinyl or vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene.

The interpolymers of one or more α-olefins and one or more vinyl aromatic monomers and/or one or more hindered aliphatic or cycloaliphatic vinyl monomers employed in the present invention are substantially random polymers. These interpolymers usually contain from 0.5 to 65, preferably from 1 to 55, more preferably from 2 to 50 mole percent of at least one vinyl aromatic monomer and/or hindered aliphatic or cycloaliphatic vinyl monomer and from 35 to 99.5, preferably from 45 to 99, more preferably from 50 to 98 mole percent of at least one aliphatic α-olefin having from 2 to 20 carbon atoms.

Other optional polymerizable ethylenically unsaturated monomer(s) include strained ring olefins such as norbornene and $C_{1-10}$ alkyl or $C_{6-10}$ aryl substituted norbornenes, with an exemplary interpolymer being ethylene/styrene/norbornene.

The number average molecular weight (Mn) of the polymers and interpolymers is usually greater than 5,000, preferably from 20,000 to 1,000,000, more preferably from 50,000 to 500,000.

Polymerization and unreacted monomer removal at temperatures above the autopolymerization temperature of the respective monomers may result in formation of some amounts of homopolymer polymerization products resulting from free radical polymerization. For example, while preparing the substantially random interpolymer, an amount of atactic vinyl aromatic homopolymer may be formed due to homopolymerization of the vinyl aromatic monomer at elevated temperatures. The presence of vinyl aromatic homopolymer is in general not detrimental for the purposes of the present invention and can be tolerated. The vinyl aromatic homopolymer may be separated from the interpolymer, if desired, by extraction techniques such as selective precipitation from solution with a non solvent for either the interpolymer or the vinyl aromatic homopolymer. For the purpose of the present invention it is preferred that no more than 20 weight percent, preferably less than 15 weight percent based on the total weight of the interpolymers of vinyl aromatic homopolymer is present.

The substantially random interpolymers are optionally modified by typical grafting, hydrogenation, functionalizing, or other reactions well known to those skilled in the art. The polymers may be readily sulfonated or chlorinated to provide functionalized derivatives according to established techniques.

The substantially random interpolymers are prepared by polymerizing a mixture of polymerizable monomers in the presence of metallocene or constrained geometry catalysts for instance as described in to EP-A-0,416,815 by James C. Stevens et al. and U.S. Pat. No. 5,703,187 by Francis J. Timmers which are incorporated herein by reference in their entirety. Preferred operating conditions for such polymerization reactions are pressures from atmospheric up to 3,000 atmospheres and temperatures from −30° C. to 200° C.

Examples of suitable catalysts and methods for preparing the substantially random interpolymers are also disclosed in U.S. application Ser. No. 07/702,475, filed May 20, 1991 corresponding to EP-A-514,828; as well as U.S. Pat. Nos. 5,055,438; 5,057,475; 5,096,867; 5,064,802; 5,132,380; 5,189,192; 5,321,106; 5,347,024; 5,350,723; 5,374,696; 5,399,635; and 5,721,185 all of which patents and applications are incorporated herein by reference in their entirety.

The substantially random α-olefin/vinyl aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in *Plastics Technology*, p. 25 (September 1992), all of which are incorporated herein by reference in their entirety.

Also suitable are the substantially random interpolymers which comprise at least one α-olefin/vinyl aromatic/vinyl aromatic/α-olefin tetrad disclosed in U.S. application Ser. No. 08/708,809 filed Sep. 4, 1996 by Francis J. Timmers et al. These interpolymers contain additional signals with intensities greater than three times the peak to peak noise. These signals appear in the chemical shift range 43.70–44.25 ppm and 38.0–38.5 ppm. Specifically, major peaks are observed at 44.1, 43.9 and 38.2 ppm. A proton test NMR experiment indicates that the signals in the chemical shift region 43.70–44.25 ppm are methine carbons and the signals in the region 38.0–38.5 ppm are methylene carbons.

In order to determine the carbon$^{-13}$ NMR chemical shifts of the interpolymers described, the following procedures and conditions are employed. A five to ten weight percent polymer solution is prepared in a mixture consisting of 50 volume percent 1,1,2,2-tetrachloroethane-$d_2$ and 50 volume percent 0.10 molar chromium tris(acetylacetonate) in 1,2,4-trichlorobenzene. NMR spectra are acquired at 130° C. using an inverse gated decoupling sequence, a 90° pulse width and a pulse delay of five seconds or more. The spectra are referenced to the isolated methylene signal of the polymer assigned at 30.000 ppm.

It is believed that these new signals are due to sequences involving two head-to-tail vinyl aromatic monomer preceded and followed by at least one α-olefin insertion, e.g. an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/vinyl aromatic monomer/ethylene tetrad will give rise to similar carbon$^{-13}$ NMR peaks but with slightly different chemical shifts.

These interpolymers are prepared by conducting the polymerization at temperatures of from −30° C. to 250° C. in the presence of such catalysts as those represented by the formula

wherein: each Cp is independently, each occurrence, a substituted cyclopentadienyl group π-bonded to M; E is C or Si; M is a group IV metal, preferably Zr or Hf, most preferably Zr; each R is independently, each occurrence, H, hydrocarbyl, silahydrocarbyl, or hydrocarbylsilyl, containing up to 30 preferably from 1 to 20 more preferably from 1 to 10 carbon or silicon atoms; each R' is independently, each occurrence, H, halo, hydrocarbyl, hydrocarbyloxy, silahydrocarbyl, hydrocarbylsilyl containing up to 30 preferably from 1 to 20 more preferably from 1 to 10 carbon or silicon atoms or two R' groups together can be a $C_{1-10}$ hydrocarbyl substituted 1,3-butadiene; m is 1 or 2; and optionally, but preferably in the presence of an activating cocatalyst. Particularly, suitable substituted cyclopentadienyl groups include those illustrated by the formula:

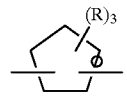

wherein each R is independently, each occurrence, H, hydrocarbyl, silahydrocarbyl, or hydrocarbylsilyl, containing up to 30 preferably from 1 to 20 more preferably from 1 to 10 carbon or silicon atoms or two R groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanediyl(2-methyl-4-phenylindenyl)) zirconium dichloride, racemic-(dimethylsilanediyl(2-methyl-4-phenylindenyl))zirconium 1,4-diphenyl-1,3-butadiene, racemic-(dimethylsilanediyl(2-methyl-4-phenylindenyl))zirconium di-$C_{1-4}$ alkyl, racemic-(dimethylsilanediyl(2-methyl-4-phenylindenyl))zirconium di-$C_{1-4}$ alkoxide, or any combination thereof and the like.

Further preparative methods for the interpolymer component (A) of the present invention have been described in the literature. Longo and Grassi (*Nakromol. Chem.*, Volume 191, pages 2387 to 2396 [1990]) and D'Anniello et al. (Journal of Applied Polymer Science, Volume 58, pages 1701–1706 [1995]) reported the use of a catalytic system based on methylalumoxane (MAO) and cyclopentadienyltitanium trichloride ($CpTiCl_3$) to prepare an ethylene-styrene copolymer. Xu and Lin (*Polymer Preprints, Am.Chem.Soc., Div.Polym.Chem.*) Volume 35, pages 686,687 [1994]) have reported copolymerization using a $MgCl_2/TiCl_4/NdCl_3/Al$ $(iBu)_3$ catalyst to give random copolymers of styrene and propylene. Lu et al. (*Journal of Applied Polymer Science,* Volume 53, pages 1453 to 1460 [1994]) have described the copolymerization of ethylene and styrene using a $TiCl_4/NdCl_3/MgCl_2/Al(Et)_3$ catalyst. Sernetz and Mulhaupt, (*Macromol. Chem. Phys.*, v. 197, pp 1071–1083, 1997) have described the influence of polymerization conditions on the copolymerization of styrene with ethylene using $Me_2Si$ $(Me_4Cp)(N$-tert-butyl$)TiCl_2$/methylaluminoxane Ziegler-Natta catalysts. The manufacture of α-olefin/vinyl aromatic monomer interpolymers such as propylene/styrene and butene/styrene are described in U.S. Pat. No. 5,244,996, issued to Mitsui Petrochemical Industries Ltd. All the above methods disclosed for preparing the interpolymer component are incorporated herein by reference.

Olefinic polymers suitable for use as component (B) in the blends according to the present invention are aliphatic α-olefin homopolymers or interpolymers, or interpolymers of one or more aliphatic α-olefins and one or more non-aromatic monomers interpolymerizable therewith such as $C_2$–$C_{20}$ α-olefins or those aliphatic α-olefins having from 2 to 20 carbon atoms and containing polar groups. Suitable aliphatic α-olefin monomers which introduce polar groups into the polymer include, for example, ethylenically unsaturated nitriles such as acrylonitrile, methacrylonitrile, ethacrylonitrile, etc.; ethylenically unsaturated anhydrides such as maleic anhydride; ethylenically unsaturated amides such as acrylamide, methacrylamide etc.; ethylenically unsaturated carboxylic acids (both mono- and difunctional) such as acrylic acid and methacrylic acid; etc.; esters (especially lower, e.g. $C_1$–$C_6$, alkyl esters) of ethylenically unsaturated carboxylic acids such as methyl methacrylate, ethyl acrylate, hydroxyethylacrylate, n-butyl acrylate or methacrylate, 2-ethyl-hexylacrylate etc.; ethylenically unsaturated dicarboxylic acid imides such an N-alkyl or N-aryl maleimides such an N-phenyl maleimide, etc. Preferably such monomers containing polar groups are acrylic acid, vinyl acetate, maleic anhydride and acrylonitrile. Halogen groups which can be included in the polymers from aliphatic α-olefin monomers include fluorine, chlorine and bromine; preferably such polymers are chlorinated polyethylenes (CPEs). Preferred olefinic polymers for use in the present invention are homopolymers or interpolymers of an aliphatic, including cycloaliphatic, α-olefin having from 2 to 18 carbon atoms. Suitable examples are homopolymers of ethylene or propylene, and interpolymers of two or more α-olefin monomers. Other preferred olefinic polymers are interpolymers of ethylene and one or more other α-olefins having from 3 to 8 carbon atoms. Preferred comonomers include 1-butene, 4-methyl-1-pentene, 1-hexene, and 1-octene. The olefinic polymer blend component (B) may also contain, in addition to the α-olefin, one or more non-aromatic monomers interpolymerizable therewith. Such additional interpolymerizable monomers include, for example, $C_4$–$C_{20}$ dienes, preferably, butadiene or 5 ethylidene-2-norbornene. The olefinic polymers can be further characterized by their degree of long or short chain branching and the distribution thereof.

One class of olefinic polymers is generally produced by a high pressure polymerization process using a free radical initiator resulting in the traditional long chain branched low density polyethylene (LDPE). LDPE employed in the present composition usually has a density of less than 0.94 g/cc (ASTM D 792) and a melt index of from 0.01 to 100, and preferably from 0.1 to 50 grams per 10 minutes (as determined by ASTM Test Method D 1238, Condition 190°/2.16).

Another class is the linear olefin polymers which have an absence of long chain branching, as the traditional linear low density polyethylene polymers (heterogeneous LLDPE) or linear high density polyethylene polymers (HDPE) made using Ziegler polymerization processes (for example, U.S. Pat. No. 4,076,698 (Anderson et al.), sometimes called heterogeneous polymers.

HDPE consists mainly of long linear polyethylene chains. The HDPE employed in the present composition usually has a density of at least 0.94 grams per cubic centimeter (g/cc) as determined by ASTM D 792, and a melt index (ASTM-1238, Condition 190°/2.16) in the range of from 0.01 to 100, and preferably from 0.1 to 50 grams per 10 minutes.

The heterogeneous LLDPE employed in the present composition generally has a density of from 0.85 to 0.94 g/cc (ASTM D 792), and a melt index (ASTM-1238, Condition 190°/2.16) in the range of from 0.01 to 100, and preferably from 0.1 to 50 grams per 10 minutes. Preferably the LLDPE is an interpolymer of ethylene and one or more other α-olefins having from 3 to 18 carbon atoms, more preferably from 3–8 carbon atoms. Preferred comonomers include 1-butene, 4-methyl-1-pentene, 1-hexene, and 1-octene.

A further class is that of the uniformly branched or homogeneous polymers (e.g. homogeneous polyethylene). The homogeneous polymers contain no long chain branches and have only branches derived from the monomers (if having more than two carbon atoms). Homogeneous polymers include those made as described in U.S. Pat. No. 3,645,992 (Elston), and those made using so-called single site catalysts in a batch reactor having relatively high olefin concentrations (as described in U.S. Pat. Nos. 5,026,798 and 5,055,438 (Canich). The uniformly branched/homogeneous polymers are those polymers in which the comonomer is randomly distributed within a given interpolymer molecule and wherein the interpolymer molecules have a similar ethylene/comonomer ratio within that interpolymer.

The homogeneous LLDPE employed in the present composition generally has a density of from 0.85 to 0.94 g/cc (ASTM D 792), and a melt index (ASTM-1238, Condition 190°/2.16) in the range of from 0.01 to 100, and preferably from 0.1 to 50 grams per 10 minutes. Preferably the LLDPE is an interpolymer of ethylene and one or more other α-olefins having from 3 to 18 carbon atoms, more preferably from 3–8 carbon atoms. Preferred comonomers include 1-butene, 4-methyl-1-pentene, 1-hexene, and 1-octene.

Further, there is the class of substantially linear olefin polymers that may advantageously be used in component (B) of the blends of the present invention. These polymers have a processability similar to LDPE, but the strength and toughness of LLDPE. Substantially linear olefin polymers are disclosed in U.S. Pat. Nos. 5,272,236 and 5,278,272 which are incorporated herein by reference.

The density of the substantially linear olefin polymers as measured in accordance with ASTM D-792 is generally from 0.85 g/cc to 0.97 g/cc, preferably from 0.85 g/cc to 0.955 g/cc, and especially from 0.85 g/cc to 0.92 g/cc.

The melt index, according to ASTM D-1238, Condition 190° C./2.16 kg (also known as $I_2$), of the substantially linear olefin polymer is generally from 0.01 g/10 min. to 1000 g/10 min., preferably from 0.01 g/10 min. to 100 g/10 min., and especially from 0.01 g/10 min. to 10 g/10 min.

Also, included are the ultra low molecular weight ethylene polymers and ethylene/α-olefin interpolymers described in the U.S. patent application Ser. No. 784,683 entitled Ultra-Low Molecular Weight Polymers, filed Jan. 22, 1997 M. J. Guest, et al., which is incorporated herein by reference. These ethylene/α-olefin interpolymers have $I_2$ melt indices greater than 1,000, or a number average molecular weight (Mn) less than 11,000.

The substantially linear olefin polymer can be a homopolymer of $C_2$–$C_{20}$ olefins, such as ethylene, propylene, 4-methyl-1-pentene, etc., or it can be an interpolymer of ethylene with at least one $C_3$–$C_{20}$ α-olefin and/or $C_2$–$C_{20}$ acetylenically unsaturated monomer and/or $C_4$–$C_{18}$ diolefin. The polymer can also be an interpolymer of ethylene with at least one of the above $C_3$–$C_{20}$ α-olefins, diolefins and/or acetylenically unsaturated monomers in combination with other unsaturated monomers.

Especially preferred olefin polymers suitable for use as component (B) comprise LDPE, HDPE, heterogeneous LLDPE, homogeneous linear polyethylene, substantially linear olefin polymer, polypropylene (PP), especially isotactic polypropylene and rubber toughened polypropylenes, or ethylene-propylene interpolymers (EP), or chlorinated polyolefins (CPE), or ethylene-vinyl acetate copolymers, or ethylene-acrylic acid copolymers, or any combination thereof. More preferably, at least one of the polymers (B) is a propylene polymer or a homo- or co-polymer of ethylene with at least one other addition polymerizable monomer, most preferably a propylene polymer, a high density polyethylene, an ethylene alpha olefin copolymer having a heat resistance (melting point) greater than about 90° C., or ethylene vinyl acetate copolymer (EVA), particularly a propylene polymer, that is a polymer having at least 50 mole percent propylene repeating units. Ethylene/alpha-olefin copolymers are preferably at least about 40 weight percent ethylene. Polypropylene is useful to improve heat resistance and modulus of Component A. Heat resistance of Component A is also conveniently improved by blending with high density polyethylene, ethylene alpha-olefin copolymer with a crystalline melting point (Tm) greater than about 90° C. or a mixture thereof. An ethylene alpha-olefin copolymer with a crystalline melting point (Tm) less than about 80° C. is useful to blend with Component A to improve the low temperature toughness thereof. Alternatively, Component B is optionally an ethylene vinyl acetate copolymer (EVA) to improve polarity of Component A.

Advantageously, the blends of the present invention comprise from 1 to 99, preferably from 5 to 95 and more preferably from 10 to 90 percent by weight of the interpolymers containing at least one aromatic vinyl monomer residue or hindered aliphatic or cycloaliphatic vinyl monomer residue or any combination thereof (component (A)) and from 1 to 99, preferably from 5 to 95, more preferably from 10 to 90 percent by weight of the polymers which do not contain any aromatic vinyl monomer residue or hindered aliphatic or cycloaliphatic vinyl monomer residue (component (B)). For high heat elastomers, the blend is preferably at least about 80 and more preferably no more than about 60 weight percent Component (A) and preferably at least about 20, more preferably at most about 60 weight percent Component (B). For thermoplastic applications like automotive parts, appliances, building and construction materials, and films, the blend is preferably at least about 10 and more preferably no more than about 30 weight percent Component (A) and preferably at least about 70, more preferably at most about 90 weight percent Component (B). The percentages are based on the total amount of the polymers consitituting the blends.

The blends of the present invention are prepared by any suitable means within the skill in the art such as, but not limited to, dry blending in a pelletized form in the desired proportions followed by melting blending in a screw extruder, Banbury mixer or the like. Dry blended pellets are conveniently directly melt processed into a final solid state article by for example injection molding. Alternatively, the blends are optionally made by direct polymerization, without isolation of the blend components, using for example one or more catalysts in one reactor or two or more reactors in series or parallel.

For the purposes of coupling and, optionally, foaming, the polymer is reacted with a polyfunctional compound capable of insertion reactions into C—H bonds. Such polyfunctional compounds have at least two, preferably 2, functional groups capable of C—H insertion reactions. Those skilled in the art are familiar with C—H insertion reactions and functional groups capable of such reactions. For instance, carbenes as generated from diazo compounds, as cited in Mathur, N. C.; Snow, M. S.; Young, K. M., and Pincock, J. A.; *Tetrahedron.* (1985), 41(8), pages 1509–1516, and nitrenes as generated from azides, as cited in Abramovitch, R. A.; Chellathurai, T.; Holcomb, W. D.; McMaster, I. T.; and Vanderpool, D. P.; *J. Org. Chem.,* (1977) 42(17), 2920–6, and Abramovitch, R. A., Knaus, G. N., *J. Org. Chem.,* (1975), 40(7), 883–9.

Compounds having at least two functional groups capable of C—H insertion under reaction conditions are referred to herein as coupling agents.

Polyfunctional compounds capable of insertions into C—H bonds include poly(sulfonyl azide)s. The poly (sulfonyl azide) is any compound having at least two sulfonyl azide groups (—$SO_2N_3$) reactive with the polyolefin. Preferably the poly(sulfonyl azide)s have a structure X—R—X wherein each X is $SO_2N_3$ and R represent an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently to permit a facile reaction between the polyolefin and the sulfonyl azide, more preferably at least 1, more preferably at least 2, most preferably at least 3 carbon, oxygen or silicon, preferably carbon, atoms between functional groups. While there is no critical limit to the length of R, each R advantageously has at least one carbon or silicon atom between X's and preferably has less than about 50, more preferably less than about 30, most preferably less than about 20 carbon, oxygen or silicon atoms. Within these limits, larger is better for reasons including thermal and shock stability. When R is straight-chain alkyl hydrocarbon, there are preferably less than 4 carbon atoms between the sulfonyl azide groups to reduce the propensity of the nitrene to bend back and react with itself. Silicon containing groups include silanes and siloxanes, preferably siloxanes. The term inertly substituted refers to substitution with atoms or groups which do not undesirably interfere with the desired reaction(s) or desired properties of the resulting coupled polymers. Such groups include fluorine, aliphatic or aromatic ether, siloxane as well as sulfonyl azide groups when more than two polyolefin chains are to be joined. Suitable structures include R as aryl, alkyl, aryl alkaryl, arylalkyl silane, siloxane or heterocyclic, groups and other groups which are inert and separate the sulfonyl azide groups as described. More preferably R includes at least one aryl group between the sulfonyl groups, most preferably at least two aryl groups (such as when R is 4,4' diphenylether or 4,4'-biphenyl). When R is one aryl group, it is preferred that the group have more than one ring, as in the case of naphthylene bis (sulfonyl azides). Poly(sulfonyl)azides include such compounds as 1,5-pentane bis(sulfonlazide), 1,8-octane bis (sulfonyl azide), 1,10-decane bis(sulfonyl azide), 1,10-octadecane bis(sulfonyl azide), 1-octyl-2,4,6-benzene tris (sulfonyl azide), 4,4'-diphenyl ether bis(sulfonyl azide), 1,6-bis(4'-sulfonazidophenyl)hexane, 2,7-naphthalene bis (sulfonyl azide), and mixed sulfonyl azides of chlorinated aliphatic hydrocarbons containing an average of from 1 to 8 chlorine atoms and from about 2 to 5 sulfonyl azide groups per molecule, and mixtures thereof. Preferred poly(sulfonyl azide)s include oxy-bis(4-sulfonylazidobenzene), 2,7-naphthalene bis(sulfonyl azido), 4,4'-bis(sulfonyl azido) biphenyl, 4,4'-diphenyl ether bis(sulfonyl azide) and bis(4-sulfonyl azidophenyl)methane, and mixtures thereof.

Sulfonyl azides are conveniently prepared by the reaction of sodium azide with the corresponding sulfonyl chloride, although oxidation of sulfonyl hydazines with various reagents (nitrous acid, dinitrogen tetroxide, nitrosonium tetrafluoroborate) has been used.

Polyfunctional compounds capable of insertions into C—H bonds also include carbene-forming compounds such as salts of alkyl and aryl hydrazones and diazo compounds, and nitrene-forming compounds such as alkyl and aryl (R—N$_3$), acyl azides (R—C(O)N$_3$), azidoformates (R—O—C(O)N$_3$), sulfonyl azides (R—SO$_2$—N$_3$), phosphoryl azides ((RO)$_2$—(PO)—N$_3$), phosphinic azides (R$_2$—P(O)—N$_3$) and silyl azides (R$_3$—Si—N$_3$). Some of the coupling agents of the invention are preferred because of their propensity to form a greater abundance of carbon-hydrogen insertion products. Such compounds as the salts of hydrazones, diazo compounds, azidoformates, sulfonyl azides, phosphroyl azides, and silyl azides are preferred because they form stable singlet-state electron products (carbenes and nitrenes) which carry out efficient carbon-hydrogen insertion reactions, rather than substantially 1) rearranging via such mechanisms as the Curtius-type rearrangement, as is the case with acyl azides and phosphinic azides, or 2) rapidly converting to the triplet-state electron configuration which preferentially undergoes hydrogen atom abstraction reactions, which is the case with alkyl and aryl azides. Also, selection from among the preferred coupling agents is conveniently possible because of the differences in the temperatures at which the different classes of coupling agents are converted to the active carbene or nitrene products. For example, those skilled in the art will recognize that carbenes are formed from diazo compounds effectively at temperatures less than 100° C., while salts of hydrazones, azidoformates and the sulfonyl azide compounds react at a convenient rate at temperatures above 100° C., up to temperatures of about 200° C. (By convenient rates it is meant that the compounds react at a rate that is fast enough to make commercial processing possible, while reacting slowly enough to allow adequate mixing and compounding to result in a final product with the coupling agent adequately dispersed and located substantially in the desired position in the final product. Such location and dispersion are sometimes different from product to product depending on the desired properties of the final product.) Phosphoryl azides are conveniently reacted at temperature in excess of 180° C. up to about 300° C., while silyl azides react preferentially at temperatures of from about 250° C. to 400° C.

The amount of poly(sulfonyl azide) used to treat blends by the practice of the invention is an amount sufficient to result in rheology modification of the blend, preferably in improved properties of the blend or to reduce the average particle size of the dispersed phase is observed by electron microscopy as compared with a blend of the same components formed with the same mixing and some other conditions but without reaction with the poly(sulfonyl azide) referred to herein as a "coupling amount." Properties improved preferably include at least one of low temperature toughness as measured by ASTM D 256-84, mechanical strength as measured by ASTM D-412, heat resistance as measured by a thermomechanical analyzer (TMA) (for which procedural detail is included hereinafter), or processability as measured by a dynamic mechanical spectrometer (DMA)(for which procedural detail is included hereinafter.) To avoid the detrimental effects of gels, the amount is preferably less than the amount sufficient to result in about 4, preferably about 2 weight percent gels in the coupled blend. This amount is preferably at least about 0.01, more preferably at least about 0.05 and preferably less than about 0.5 more preferably less than about 0.4, most preferably less than about 0.3 weight percent of poly(sulfonyl azide) based on total weight of polymers in the blend.

For coupling, the sulfonyl azide is admixed with the polymer and heated to at least the decomposition temperature of the sulfonyl azide. By decomposition temperature of the azide it is meant that temperature at which the azide converts to the sulfonyl nitrene, eliminating nitrogen and heat in the process, as determined by differential scanning calorimetry (DSC). The poly(sulfonyl azide) begins to react at a kinetically significant rate (convenient for use in the practice of the invention) at temperatures of about 130° C. and is almost completely reacted at about 160° C. in a DSC (scanning at 10° C./min). The temperature of the peak observed in a DSC scan of decomposition v. temperature, is referred to herein as the "peak decomposition temperature" and is the decomposition temperature referred to herein unless stated otherwise. ARC (scanning at 2° C./hr) shows onset of decomposition is about 100° C. Extent of reaction is a function of time and temperature. At the low levels of azide used in the practice of the invention, the optimal properties are not reached until the azide is essentially fully reacted. Temperatures for use in the practice of the invention are also determined by the softening or melt temperatures of the polymer starting materials. For these reasons, the temperature is advantageously greater than about 90° C., preferably greater than about 120° C., more preferably greater than about 150° C., most preferably greater than 170° C. Formation of free radicals is preferably avoided; therefore, temperatures in excess of about 250° C. are preferably avoided; more preferably the temperature is less than about 200° C.

Preferred times at the desired decomposition temperatures are times that are sufficient to result in reaction of the coupling agent with the polymer(s) without undesirable thermal degradation of the polymer matrix. Preferred reaction times in terms of the half life of the coupling agent, that is the time required for about half of the agent to be reacted at a preselected temperature, which half life is determinable by DSC in about 5 half lives of the coupling agent. In the case of a bis(sulfonyl azide), for instance, the reaction time is preferably at least about 4 minutes at 200° C.

Admixing of the polymer and coupling agent is conveniently accomplished by any means within the skill in the art. Desired distribution is different in any cases, depending on what properties are to be modified. In a blend it is often desirable to have low solubility in one or more or the polymer matrices such that the azide is preferentially in the other phase, or predominantly in the interfacial region between the two phases.

Treatment of blends with the poly(sulfonyl azide) according to practice of the invention results in blends of the invention which are referred to herein as chain coupled, reactively coupled or coupled blends. A blend is advantageously mixed with a poly(sulfonyl azide) above the softening temperature of at least one component of the blend, most preferably below the peak decomposition temperature of the poly(sulfonyl azide), and the resulting mixture is preferably raised to at least the peak decomposition temperature of the poly(sulfonyl azide). Practice of the invention advantageously involves forming a substantially uniform admixture of polymers and poly(sulfonyl azide) before decomposition of the poly(sulfonyl azide), although in the case of blends where there are dispersed and continuous phases, it is sufficient that the poly(sulfonyl azide) be dispersed at the interface of the phases rather than uniformly distributed in particularly the dispersed phase unless chain coupling of the dispersed phase itself is desired. Most preferably, the poly(sulfonyl azide) and resulting coupling is distributed primarily at the interface of the different polymers. Distribution primarily at the interface is advantageously achieved by adding the polyazide after the two immiscible polymers have been mixed to the extent that a minimum dispersed polymer particle size has been achieved.

This allows for the maximum amount of interfacial surface area to be available for reaction of the polyazide.

Where there are dispersed and continuous phases, it is most preferable, but not necessary, to add the poly(sulfonyl azide) after the blend of two or more polymers is well mixed, that is a point when the particle size of the dispersed polymer has reached the smallest size practically attainable on the particular mixing devise being used. At least one of the lend polymer components is preferably at least at its softening temperature. More preferably mixing occurs or is continued when the blend is at a temperature sufficient for the poly(sulfonyl azide) to react to form a reactive species believed to be a singlet nitrene capable of inserting into carbon-hydrogen bonds, that is at its decomposition temperature. This allows for optimum reaction at the interface between the two polymers. While it is preferred that mixing of the blend and poly(sulfonyl azide) precede a temperature increase to the decomposition temperature, alternatively, mixing occurs at or above the decomposition temperature of the poly(sulfonyl azide).

It is believed that the improved properties exhibited by blends of the invention results from the formation of polymers coupled between components of the blend. This coupled polymer would then act as a compatibilizer and lower the interfacial tension between the blend components. The result is believed to be a finer dispersion of the dispersed phase or a coupling of dispersed particles to the continuous phase polymer leading to improved properties. For use in foaming the coupled polymer is optionally coupled separately from the foaming process and used in a foaming process within the skill in the art. Such processes for coupling include at least one of (a) dry blending the coupling agent with the polymer, preferably to form a substantially uniform admixture and adding this mixture to melt processing equipment, e.g. a melt extruder to achieve the coupling reaction, at a temperature at least the decomposition temperature of the coupling agent; (b) introducing, e.g. by injection, a coupling agent in liquid form, e.g. dissolved in a solvent therefor or in a slurry of coupling agent in a liquid, into a device containing polymer, preferably softened, molten or melted polymer, but alternatively in particulate form, in solution or dispersion, more preferably in melt processing equipment; (c) forming a first admixture of a first amount of a first polymer and a coupling agent, advantageously at a temperature less than about the decomposition temperature of the coupling agent, preferably by melt blending, and then forming a second admixture of the first admixture with a second amount of a second polymer (for example a concentrate of a coupling agent admixed with at least one polymer and optionally other additives, is conveniently admixed into a second polymer or combination thereof optionally with other additives, to modify the second polymer(s)); (d) feeding at least one coupling agent, preferably in solid form, more preferably finally comminuted, e.g. powder, directly into softened or molten polymer, e.g. in melt processing equipment, e.g. in an extruder; or combination thereof. Among processes (a) through (d), processes (b) and (c) are preferred, with (c) most preferred. For example, process (c) is conveniently used to make a concentrate with a first polymer composition having a lower melting temperature, advantageously at a temperature below the decomposition temperature of the coupling agent, and the concentrate is melt blended into a second polymer composition having a higher melting temperature to complete the coupling reaction. Concentrates are especially preferred when temperatures are sufficiently high to result in loss of coupling agent by evaporation or decomposition not leading to reaction with the polymer, or other conditions would result that effect. Alternatively, some coupling occurs during the blending of the first polymer and coupling agent, but some of the coupling agent remains unreacted until the concentrate is blended into the second polymer composition. Each polymer or polymer composition includes at least one homopolymer, copolymer, terpolymer, or interpolymer and optionally includes additives within the skill in the art. When the coupling agent is added in a dry form it is preferred to mix the agent and polymer in a softened or molten state below the decomposition temperature of the coupling agent then to heat the resulting admixture to a temperature at least equal to the decomposition temperature of the coupling agent.

The term "melt processing" is used to mean any process in which the polymer is softened or melted, such as extrusion, pelletizing, molding, thermoforming, film blowing, compounding in polymer melt form, fiber spinning, and the like.

The polyolefin(s) and coupling agent are suitably combined in any manner which results in desired reaction thereof, preferably by mixing the coupling agent with the polymer(s) under conditions which allow sufficient mixing before reaction to avoid uneven amounts of localized reaction then subjecting the resulting admixture to heat sufficient for reaction. Preferably, a substantially uniform admixture of coupling agent and polymer is formed before exposure to conditions in which chain coupling takes place. A substantially uniform admixture is one in which the distribution of coupling agent in the polymer is sufficiently homogeneous to be evidenced by a polymer having a melt viscosity after treatment according to the practice of the invention either higher at low angular frequency (e.g. 0.1 rad/sec) or lower at higher angular frequency (e.g. 100 rad/sec) than that of the same polymer which has not been treated with the coupling agent but has been subjected to the same shear and thermal history. Thus, preferably, in the practice of the invention, decomposition of the coupling agent occurs after mixing sufficient to result in a substantially uniform admixture of coupling agent and polymer. This mixing is preferably attained with the polymer in a molten or melted state, that is above the crystalline melt temperature, or in a dissolved or finely dispersed condition rather than in a solid mass or particulate form. The molten or melted form is more preferred to insure homogeniety rather than localized concentrations at the surface.

While any equipment is suitably used, preferably equipment which provides sufficient mixing and temperature control in the same equipment, but advantageously practice of the invention takes place in such devices as an extruder or a static polymer mixing devise such as a Brabender blender. The term extruder is used for its broadest meaning to include such devices as a device which extrudes pellets or pelletizer.

In a preferred embodiment of the invention, the process of the present invention takes place in a single vessel, that is mixing of the coupling agent and polymer takes place in the same vessel as heating to the decomposition temperature of the coupling agent and the foaming process. The vessel is preferably an extruder suitable for foam preparation. The reaction vessel more preferably has at least two zones of different temperatures into which a reaction mixture passes, the first zone advantageously being at a temperature at least the crystalline melt temperature or the softening temperature of the polymer(s) and preferably less than the decomposition temperature of the coupling agents and the second zone being at a temperature sufficient for decomposition of the coupling agent. The first zone is preferably at a temperature sufficiently high to soften the polymer and allow it to combine with the coupling agent through distributive mixing to a substantially uniform admixture. Addition of a blowing agent conveniently occurs in either of these zones, depending on the temperatures advantageous for its use.

For polymers that have softening points above the coupling agent decomposition temperature (preferably greater than 200° C.), and especially when incorporation of a lower melting polymer (such as in a concentrate) is undesirable, the preferred embodiment for incorporation of coupling agent is to solution blend the coupling agent in solution or admixture into the polymer, to allow the polymer to imbibe (absorb or adsorb at least some of the coupling agent), and then to evaporate the solvent. After evaporation, the resulting mixture is extruded. The solvent is preferably a solvent for the coupling agent, and more preferably also for the polymer when the polymer is soluble such as in the case of polycarbonate. Such solvents include polar solvents such as acetone, THF (tetrahydrofuran) and chlorinated hydrocarbons such as methylene chloride. Alternatively other non-polar compounds such as mineral oils in which the coupling agent is sufficiently miscible to disperse the coupling agent in a polymer, are used.

Practice of the process of the invention to rheology modify polymer blends and form foams thereof yields rheology modified or chain coupled polymer foams, that is foams of polymers which have sulfonamide, amine, alkyl-substituted or aryl-substituted carboxamide, alkyl-substituted or aryl-substituted phosphoramide, alkyl-substituted or aryl-substituted methylene coupling between different polymer chains. Such coupled polymer blends advantageously show higher low shear viscosity than the original polymer due to coupling of long polymer chains to polymer backbones. Broad molecular weight distribution polymers (polydispersity (P.D.) of 3.5 and greater) and gel levels less than 10 percent as determined by xylene extraction show less improvement than the dramatic effect noted in narrow MWD polymer (P.D.=2.0) with gel less than 10 percent as determined by xylene extraction. The latter are, therefore, preferred for use in the practice of the invention. Coupling leads to polymers which have controlled rheological properties, specifically improved melt strength as evidenced by increased low shear viscosity.

Foam forming steps of the process are within the skill in the art. For instance as exemplified by the excellent teachings to processes for making ethylenic polymer foam structures and processing them in C. P. Park, "Polyolefin Foam", Chapter 9, Handbook of Polymer Foams and Technology, edited by D. Klempner and K. C. Frisch, Hanser Publishers, Munich, Vienna, New York, Barcelona (1991), which is incorporated here in by reference.

The resulting foam structure is optionally made by a conventional extrusion foaming process. The structure is advantageously prepared by heating an ethylenic polymer material to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point. The blowing agent is optionally incorporated or mixed into the melt polymer material by any means known in the art such as with an extruder, mixer, blender, or the like. The blowing agent is mixed with the melt polymer material at an elevated pressure sufficient to prevent substantial expansion of the melt polymer material and to advantageously disperse the blowing agent homogeneously therein. Optionally, a nucleator is optionally blended in the polymer melt or dry blended with the polymer material prior to plasticizing or melting. The foamable gel is typically cooled to a lower temperature to optimize physical characteristics of the foam structure. The gel is then extruded or conveyed through a die of desired shape to a zone of reduced or lower pressure to form the foam structure. The zone of lower pressure is at a pressure lower than that in which the foamable gel is maintained prior to extrusion through the die. The lower pressure is optionally superatmospheric or subatmospheric (vacuum), but is preferably at an atmospheric level.

In another embodiment, the resulting foam structure is optionally formed in a coalesced strand form by extrusion of the ethylenic polymer material through a multi-orifice die. The orifices are arranged so that contact between adjacent streams of the molten extrudate occurs during the foaming process and the contacting surfaces adhere to one another with sufficient adhesion to result in a unitary foam structure. The streams of molten extrudate exiting the die take the form of strands or profiles, which desirably foam, coalesce, and adhere to one another to form a unitary structure. Desirably, the coalesced individual strands or profiles should remain adhered in a unitary structure to prevent strand delamination under stresses encountered in preparing, shaping, and using the foam. Apparatuses and method for producing foam structures in coalesced strand form are seen in U.S. Pat. Nos. 3,573,152 and 4,824,720, both of which are incorporated herein by reference.

Alternatively, the resulting foam structure is conveniently formed by an accumulating extrusion process as seen in U.S. Pat. No. 4,323,528, which is incorporated by reference herein. In this process, low density foam structures having large lateral cross-sectional areas are prepared by: 1) forming under pressure a gel of the ethylenic polymer material and a blowing agent at a temperature at which the viscosity of the gel is sufficient to retain the blowing agent when the gel is allowed to expand; 2) extruding the gel into a holding zone maintained at a temperature and pressure which does not allow the gel to foam, the holding zone having an outlet die defining an orifice opening into a zone of lower pressure at which the gel foams, and an openable gate closing the die orifice; 3) periodically opening the gate; 4) substantially concurrently applying mechanical pressure by a movable ram on the gel to eject it from the holding zone through the die orifice into the zone of lower pressure, at a rate greater than that at which substantial foaming in the die orifice occurs and less than that at which substantial irregularities in cross-sectional area or shape occurs; and 5) permitting the ejected gel to expand unrestrained in at least one dimension to produce the foam structure.

In another embodiment, the resulting foam structure is formed into non-crosslinked foam beads suitable for molding into articles. To make the foam beads, discrete resin particles such as granulated resin pellets are: suspended in a liquid medium in which they are substantially insoluble such as water; impregnated with a blowing agent by introducing the blowing agent into the liquid medium at an elevated pressure and temperature in an autoclave or other pressure vessel; and rapidly discharged into the atmosphere or a region of reduced pressure to expand to form the foam beads. This process is well taught in U.S. Pat. Nos. 4,379,859 and 4,464,484, which are incorporated herein by reference.

One modification of the uncrosslinked bead process, styrene monomer is optionally impregnated into the suspended pellets prior to their impregnation with blowing agent to form a graft interpolymer with the ethylenic polymer material. The polyethylene/polystyrene interpolymer beads are cooled and discharged from the vessel substantially unexpanded. The beads are then expanded and molded by an expanded polystyrene bead molding process within the skill in the art. A process of making polyethylene/polystyrene interpolymer beads is described for instance in U.S. Pat. No. 4,168,353, which is incorporated herein by reference.

The foam beads are conveniently then molded by any means within the skill in the art, such as charging the foam beads to the mold, compressing the mold to compress the beads, and heating the beads such as with steam to effect coalescing and welding of the beads to form the article. Optionally, the beads are impregnated with air or other blowing agent at an elevated pressure and temperature prior to charging to the mold. Further, the beads are optionally heated prior to charging. The foam beads are conveniently then molded to blocks or shaped articles by a suitable molding method within the skill in the art such as taught for instance in U.S. Pat. Nos. 3,504,068 and 3,953,558. Excellent teachings of the above processes and molding methods are seen in C. P. Park, supra, p. 191, pp. 197–198, and pp. 227–229, which are incorporated herein by reference.

Blowing agents useful in making the resulting foam structure include inorganic agents, organic blowing agents and chemical blowing agents. Suitable inorganic blowing agents include carbon dioxide, nitrogen, argon, water, air, nitrogen, and helium. Organic blowing agents include aliphatic hydrocarbons having 1–6 carbon atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, isobutane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC-143a), 1,1,1,2-tetrafluoro-ethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), 1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Chemical blowing agents include azodicarbonamide, azodiisobutyronitrile, barium azodicarboxylate, N,N'-dimethyl-N,N'-dinitrosoterephthalamide, and benzenesulfonhydrazide, 4,4-oxybenzene sulfonyl semicarbazide, and p-toluene sulfonyl semicarbazide trihydrazino triazine. Preferred blowing agents include isobutene, HFC-152a, and mixtures of the foregoing.

The amount of blowing agent incorporated into the polymer melt material to make a foam-forming polymer gel is from about 0.2 to about 5.0, preferably from about 0.5 to about 3.0, and most preferably from about 1.0 to 2.50 gram moles per kilogram of polymer.

Foams are optionally perforated to enhance or accelerate permeation of blowing agent from the foam and air into the foam. The foams are optionally perforated to form channels which extend entirely through the foam from one surface to another or partially through the foam. The channels are advantageously spaced up to about 2.5 centimeters apart and preferably up to about 1.3 centimeters apart. The channels are advantageously present over substantially an entire surface of the foam and preferably are uniformly dispersed over the surface. The foams optionally employ a stability control agent of the type described above in combination with perforation to allow accelerated permeation or release of blowing agent while maintaining a dimensionally stable foam. Such perforation is within the skill in the art, for instance as taught in U.S. Pat. Nos. 5,424,016 and 5,585,058, which are incorporated herein by reference.

Various additives are optionally incorporated in the resulting foam structure such as stability control agents, nucleating agents, inorganic fillers, pigments, antioxidants, acid scavengers, ultraviolet absorbers, Flame retardants, processing aids, extrusion aids, and the like.

A stability control agent is optionally added to the present foam to enhance dimensional stability. Preferred agents include amides and esters of C10-24 fatty acid. Such agents are seen in U.S. Pat. Nos. 3,644,230 and 4,214,054, which are incorporated herein by reference. Most preferred agents include stearyl stearamide, glyceromonostearate, glycerol monobehenate, and sorbitol monostearate. Typically, such stability control agents are employed in an amount ranging from about 0.1 to about 10 parts per hundred parts of the polymer.

The resulting foam structure preferably exhibits excellent dimensional stability. Preferred foams recover 80 or more percent of initial volume within a month with initial volume being measured within 30 seconds after foam expansion. Volume is measured by a suitable method such as cubic displacement of water.

In addition, a nucleating agent is optionally added in order to control the size of foam cells. Preferred nucleating agents include inorganic substances such as calcium carbonate, talc, clay, titanium oxide, silica, barium sulfate, diatomaceous earth, mixtures of citric acid and sodium bicarbonate, and the like. The amount of nucleating agent employed may range from about 0.01 to about 5 parts by weight per hundred parts by weight of a polymer resin.

The resulting foam structure is substantially non-crosslinked or uncrosslinked. The polymer material comprising the foam structure is substantially free of crosslinking. The foam structure contains no more than 5 percent gel as measured according to ASTM D-2765-84 Method A. A slight degree of crosslinking, which occurs naturally without the use of crosslinking agents or radiation, is permissible.

The resulting foam structure preferably has a density of less than 250, more preferably less than 100 and most preferably from about 10 to about 70 kilograms per cubic meter. The foam preferably has an average cell size of from about 0.05 to about 5.0, more preferably from about 0.2 to about 2.0, and most preferably 0.3 to about 1.8 millimeters as measured according to the procedures of ASTM D3576.

The resulting foam structure optionally is in any physical configuration within the skill in the art, such as extruded sheet, rod, plank, and profiles. The foam structure is optionally formed by molding e.g. of expandable beads into any of the foregoing configurations or any other configuration.

The resulting foam structure is optionally closed-celled or open-celled. Preferably, the present foam contains about 80 percent or more closed cells as measured according to ASTM D2856-A.

In the most preferred embodiment the foam forming step or steps and the coupling steps are at least partially simultaneous. Thus the coupling agent is introduced during any step before or in a foam forming process that is of a temperature sufficiently low to result in adequate mixing before or during coupling and coupling takes place in or simultaneous with any step in a foam forming process in which the temperature is at least about the decomposition temperature of the coupling agent. Coupling, however, preferably takes place before the foam is extruded or otherwise exits the vessel in which the polymer is admixed with any blowing agent.

Foams prepared according to the practice of the invention advantageously have one or preferably more of smaller cell diameter, homogeneous cell diameter distribution, lower foam density, higher tensile and/or compressive strength, or higher tensile and/or compressive toughness than foams made from the same starting materials but not coupled using C-H insertion coupling agents, preferably sulfonyl azides, more preferably than foams formed from the same starting materials and coupled using free radical means, especially peroxides. Cell size is measured according to the procedure of ASTMD-3576; tear strength is measured according to the procedure of ASTMD-624; tensile properties including tensile strength, compressive strength and toughness are measured according to the procedures of ASTMD-412. Additives such as antioxidants (e.g., hindered phenols such as, for example, Irganox™ 1010), phosphites (e.g., Irgafos™ 168) both commercially available from Ciba Geigy Corporation, U. V. stabilizers, cling additives (e.g., polyisobutylene), antiblock additives, colorants, pigments, fillers, and the like are optionally also included in the interpolymers employed in the blends of and/or employed in the present invention, to the extent that they do not interfere with the enhanced properties discovered by Applicants.

The additives are advantageously employed in functionally equivalent amounts known to those skilled in the art. For example, the amount of antioxidant employed is that amount which prevents the polymer or polymer blend from undergoing oxidation at the temperatures and environment employed during storage and ultimate use of the polymers. Such amount of antioxidants is usually in the range of from 0.01 to 10, preferably from 0.05 to 5, more preferably from 0.1 to 2 percent by weight based upon the weight of the polymer or polymer blend. Similarly, the amounts of any of the other enumerated additives are the functionally equivalent amounts such as the amount to render the polymer or polymer blend antiblocking, to produce the desired amount of filler loading to produce the desired result, to provide the desired color from the colorant or pigment. Such additives are advantageously employed in the range of from 0.05 to 50, preferably from 0.1 to 35, more preferably from 0.2 to 20 percent by weight based upon the weight of the polymer or polymer blend. Fillers, however are advantageously employed in amounts up to about 90 percent by weight based on the weight of the polymer or polymer blend.

The blends of the present invention, in addition to the production of foams, are advantageously used to produce a wide range of fabricated articles including calendared, cast and blown sheets and films, compression and injection molded parts, fibers and the like. The blends are also useful in applications such as modifiers for bitumen and asphalt compositions and as components for hot melt and pressure sensitive adhesive systems.

The following examples are to illustrate this invention and do not limit it. Ratios, parts, and percentages are by weight unless otherwise stated. Examples (Ex) of the invention are designated numerically while comparative samples (C.S.) are designated alphabetically and are not examples of the invention.

Test Methods

The viscosity of polymer as a function of shear rate was measured according to the following method. A dynamic mechanical spectrometer commercially available from Rheometrics, Inc. under the trade designation RMS-800 with 25 mm diameter parallel plates was used to determine the dynamic rheological data. A frequency sweep with five logarithmically spaced points per decade was run from 0.1 to 100 rad/s at 190° C. The strain was determined to be within the linear viscoelastic regime by performing a strain sweep at 0.1 rad/s and 190° C., by strain sweep from 2 to 30 percent strain in 2 percent steps to determine the minimum required strain to produce torques within the specification of the transducer; another strain sweep at 100 rad/s and 190° C. was used to determine the maximum strain before nonlinearity occurred according to the procedure disclosed by J. M. Dealy and K. F. Wissbrun, "Melt Rheology and Its Role in Plastics Processing", Van Nostrand, New York (1990).

Viscosity and melt index tests were performed in a nitrogen purge to minimize oxidative degradation.

A thermomechanical analyzer (TMA) commercially available from Perkin Elmer Corporation under the trade designation model TMA 7 was used to measure the upper service temperature (UST). Probe force of 102 g and heating rate of 5° C./min were used. Each test specimen was a disk with thickness of about 2 mm and diameter, prepared by compression molding at 205° C. and air-cooling to room temperature. Temperature at the probe penetration of 1 mm is taken as the upper service temperature.

Xylene Extraction to determine gel content was performed by weighing out 1 gram samples of polymer. The samples are transferred to a mesh basket which is then placed in boiling xylene for 12 hours. After 12 hours, the sample baskets are removed and placed in a vacuum oven at 150° C. and 28 in. of Hg vacuum for 12 hours. After 12 hours, the samples are removed, allowed to cool to room temperature over a 1 hour period, and then weighed. The results are reported as percent polymer extracted. Percent extracted=(initial weight−final weight)/initial weight according to ASTM D-2765 Procedure "A".

Tensile properties were determined by compression molding 1/16 inch plaques. Tensile specimens were then cut from these plaques and tested on an instrument commercially available from Instron Corporation under the trade designation Instron model 1122 load frame using 0.870 inch (2.2 cm) micro-tensile samples measured at an extension rate of 5 inch/min (12.7 cm/min). Tensile at break and elongation at break, were measured in accordance with ASTM D-412. The toughness was measured as the area under the stress/strain curve.

The melt index for the ethylene based polymers was measured according to ASTM D-1238 under conditions of 190° C./2.16 Kg (formerly known as Condition E).

General procedures for determining compression set are described in ASTM D 395-89. The sample plaques were cut into disks of 1.14 inch (2.90 cm) diameter. The disks were stacked up to a thickness of 0.5 inch (1.27 cm). Test specimens were measured under constant strain of 25 percent, at 70° C. for 22 h. The sample was aged at 70° C. for 22 h under 25 percent compression, then cooled to 22° C.

Test parts and characterization data for the interpolymers and their blends are generated according to the following procedures:

Compression Molding: Samples are melted at 190° C. for 3 minutes and compression molded at 190° C. under 20,000 lb (9.072 kg) of pressure for another 2 minutes. Subsequently, the molten materials are quenched in a press equilibrated at room temperature.

Density: The density of the samples is measured according to ASTM-D792.

The following materials were used:

PE (polyethylene): An ethylene octene copolymer with melt index of 1 g/10 min, density of 0.092 g/cc commercially available from Dow Chemical Company under the trade designation Affinity PL1880 polyolefin plastomer is used as the polyethylene.

PP (polypropylene): Isotactic polypropylene used in the blends is commercially available from Himont Incorporated under the trade designation Profax 6523 polypropylene. The product has a melt flow rate of 4.0 g/10 min (measured at 230° C.). This product has a Tensile strength at yield of 5000 PSI (34500 kPa) and a flex modulus of 250,000 PSI (1723, 500 kPa).

HDPE: HDPE is a high density polyethylene with melt index of 30 g/min, density of 0.9600 g/10 min., commercially available from Dow Chemical Company under the trade designation HDPE HD 30460 M polyethylene ESI-1: an experimental ethylene/styrene copolymer made using a solution process for which procedural detail is included hereafter. This copolymer is 41 weight percent styrene and 58 weight percent ethylene. The overall sample also contains 2.0 weight percent homopolymer styrene as an impurity. It has a melt index (MI) of 0.1 g/10 minutes at 190° C. under 2.16 kg load.

ESI-2: is an ethylene-styrene interpolymer having 60 weight percent of styrene and 40 weight percent of ethylene, containing atactic polystyrene of 7.5 weight percent, and having a melt index of 0.5 g/10 min.

The Ethylene Styrene Interpolymers (ESI-1 and ESI-2) are synthesized according to the following general procedure:

Reactor Description

A 6 gallon (22.7 L), oil jacketed, autoclave continuously stirred tank reactor (CSTR) was employed as the reactor. A magnetically coupled agitator with impellers commercially available from Lightning Mixers, Inc. under the trade designation A-320 impellers provides the mixing. The reactor ran liquid full at 475 psig (3.275 kPa). Process flow was in the bottom and out the top. A heat transfer oil was circulated through the jacket of the reactor to remove some of the heat of reaction. After the exit from the reactor there was a flow meter that measured flow and solution density. All lines on the exit of the reactor were traced with 50 psi (344.7 kPa) steam and insulated.

Procedure

Solvent (ethylbenzene for ESI-1 and toluene for ESI-2) was supplied to the reactor at 30 psig (207 kPa). The feed to the reactor was measured by a mass flow meter. A variable speed diaphragm pump controlled the feed rate of solvent. At the discharge of the solvent pump, a side stream was taken to provide flush flows for the catalyst injection line (1 lb/hr (0.45 kg/hr)) and the reactor agitator (0.75 lb/hr (0.34 kg/hr)). These flows were measured by differential pressure flow meters and controlled by manual adjustment of microflow needle valves. Uninhibited styrene monomer was supplied to the reactor at 30 psig (308 kPa). The feed to the reactor was measured by a mass flow meter. A variable speed diaphragm pump controlled the feed rate. The styrene stream was mixed with the remaining solvent stream. Ethylene was supplied to the reactor at 600 psig (4,238 kPa). The ethylene stream was measured by a mass flow meter just prior to a valve controlling flow. A flow meter controller was used to deliver hydrogen into the ethylene stream at the outlet of the ethylene control valve. The ethylene/hydrogen mixture combines with the solvent/styrene stream at ambient temperature. The temperature of the solvent/monomer as it enters the reactor was reduced to about 5° C. by a heat exchanger with −5° C. glycol on the jacket thereof. This solvent/styrene stream entered the bottom of the reactor. The three component catalyst system described in Table 2 and its solvent flush also enter the reactor at the bottom but through a different port than the monomer stream. Preparation of the catalyst components took place in an inert atmosphere glove box. The diluted components were put in nitrogen padded cylinders and charged to catalyst run tanks for the reaction. From these run tanks the catalyst was pressured with piston pumps and the flow was measured with flow meters. These streams combine with each other and the catalyst flush solvent just prior to entry through a single injection line into the reactor where they react to form the designated polymer.

Polymerization was stopped as reaction mixture flows into a reactor product line after the reactor, by addition of catalyst kill (water mixed with solvent) into the reactor product line after a flow meter which measures solution density. A static mixer in the line provided dispersion of the catalyst kill and additives in the reactor effluent stream. This stream next entered post reactor heaters that provide additional energy for the solvent removal flash. This flash occurred as the effluent exited the post reactor heater and the pressure was dropped from 475 psig (3,275 kPa) down to ~250 mm Hg (33 kPa) of pressure absolute at the reactor pressure control valve. This flashed polymer entered a hot oil jacketed devolatilizer. Approximately 85 percent of the volatile compounds (hereinafter volatiles) were removed from the polymer in the devolatilizer. The volatiles exit the top of the devolatilizer. The stream of exiting volatiles was condensed and with a glycol jacketed exchanger, entered the suction of a vacuum pump and was discharged to a glycol jacket solvent and styrene/ethylene separation vessel. Solvent and styrene were removed from the bottom of the vessel and ethylene from the top. The ethylene stream was measured with a flow meter and analyzed for composition. The measurement of vented ethylene plus a calculation of the dissolved gasses in the solvent/styrene stream were used to calculate the ethylene conversion. The polymer separated in the devolatilizer was pumped out with a gear pump to an extruder commercially available from Werner Pfleiderer Corporation under the trade designation ZSK-30 devolatilizing vacuum extruder. The dry polymer exits the extruder as a single strand. This strand was cooled as it was pulled through a water bath. The excess water was blown from the strand with air and the strand was chopped into pellets with a strand chopper.

The catalyst used in preparing ESI-1 was (t-butylamido) dimethyl(tetramethylcyclopentadienyl)silane-titanium (II) 1,3-pentadiene. The catalyst used in preparing ESI 2 was Titanium, [1,1'-(η4-1,3-butadiene-1,4-diyl)bis[benzene]][1-[(1,2,3,3a,11b-η)-1H-cyclopenta[1]phenanthren-1-yl]-N-(1, 1-dimethylethyl)-1,1-dimethylsilanaminato(2-)-N]-. The cocatalyst was bis-hydrogenated tallowalkyl methylammonium tetrakis(pentafluorophenyl)borate. A modified methylaluminoxane commercially available from Akzo Nobel Chemicals Inc. under the trade designation MMAO-3A was also used in the amounts indicated in Tables 1 and 2 and is referred to herein as MMAO.

TABLE 2a

Catalyst to Cocatalyst ratio and MMAO to Catalyst Ratio

|  | Molar ratio of cocatalyst/Catalyst | Molar ratio of MMAO to catalyst |
|---|---|---|
| ESI-1 | 1.25:1 | 10.0:1 |
| ESI-2 | 5:1 | 15:1 |

TABLE 2b

Reactor Data

| Polymer | Reactor Temp. °C. | Solv Flow lb/hr | Solv Flow kg/hr | Ethylene Flow lb/hr | Ethylene Flow kg/hr | Hydrogen Flow SCCM | Styrene Flow lb/hr | Styrene Flow kg/hr | Ethylene Conv % |
|---|---|---|---|---|---|---|---|---|---|
| ESI-1 | 94 | 37 | 16.76 | 2.8 | 0.41 | 3.0 | 5.0 | 2.27 | 96.5 |
| ESI-2 | 67.9 | 30 | 13.59 | 1.3 | 0.186 | 0 | 10 | 4.53 | 86.3 |

SCCM means standard cubic centimeter
Conv. means conversion
Solv. means solvent.
Temp. means temperature.

Preparation of 4,4'-disulfonylazidophenyl Ether 4,4'-bis(chlorosulfonyl)phenyl ether (10 g, 0.027 mole) was dissolved in 100 mL of acetone and 4.426 g (0.06808 moles) of solid sodium azide was added portionwise over the course of 15 minutes. The reaction mixture was stirred for 26 hours at ambient temperature and then was filtered to remove sodium chloride. The resulting filter cake was washed with acetone and the combined filtrate evaporated to yield a white solid which was washed twice with 20 mL portions of water and then dried at ambient temperature under vacuum. The resulting white solid (7.3 g, 70 percent yield) was identified as 4,4'-disulfonylazidophenyl ether by 1H and 13C NMR spectroscopy.

Comparative Sample A

In a mixing bowl (40.0 g) heated to 190° C. with the roller blades turning at 75 RPM was placed 14.0 grams of the polypropylene. After the polypropylene had melted, 26.0 of ES 41 was added. After addition of the ES 41 polymer, the admixed sample was mixed at 190° C. for 10 minutes. The sample was removed and allowed to cool. The sample was compression molded into a 1/16 inch (1.58 mm) thick plaque at 190° C. and 20,000 pounds (5,072 kg) of force for 8 minutes. The sample was removed and cooled. The tensile properties, the UST, the compression set at 70° C. and the percent gel by xylene extraction were determined. The results are shown in Table 1.

EXAMPLES 1 AND COMPARATIVE EXAMPLE B

The procedure of Comparative Example A was repeated except that 2 minutes after the addition of the second polymer, 0.08 g (0.2 mmol, 0.2 weight percent) of 4,4'-disulfonylazidophenyl ether was added. The sample was mixed for 8 more minutes and removed from the mixer. This sample is Example 1.

For Comparative Sample B, procedure of Example 1 was followed except that 0.20 g (0.5 mmole, 0.5 weight percent) of 4,4'-disulfonylazidophenyl ether was added.

After cooling, both samples were compression molded into a 1/16 inch (1.58 mm) thick plaque at 190° C. and 20,000 pounds (5,072 kg) of force for 8 minutes. The samples were removed and cooled. The tensile properties, the UST, the compression set at 70° C. and the percent gel by xylene extraction of the samples were determined. The results are shown in Table 1.

TABLE 3

| Sample | UST (TMA) | % Change in UST | MI (I2, 190° C.) | MI (I10, 190° C.) | % Elongation | Break Stress (PSI) | Break Stress in kPa | Compression Set | % Gel |
|---|---|---|---|---|---|---|---|---|---|
| C.S. A | 98 | 0 | 0.4 | 8.3 | 520 | 2900 | 19990 | 100% | 0 |
| EX. 1 | 142 | 44.9 | 0.2 | 15.8 | 510 | 2700 | 18610 | 100% | 0 |
| C.S B | 160 | 63.2 | <0.01 | 1.5 | 350 | 2300 | 15870 | 80% | 53 |

The examples show how a small amount of (0.2 weight percent) of 4,4'-disulfonylazidophenyl ether is capable of improving the temperature resistance of ethylene styrene interpolymer/polypropylene blends without inducing crosslinking (as evidenced by the 0 percent gel measurement of Example 1) or deterioration of the physical properties. Furthermore, the sample is still melt processable and demonstrates increased processability at higher shear rates (as evidenced by the x10 values). Control Sample B shows that the processability of the blend reduces (low melt index) and gels are formed if excessive sulfonylazide (more than about 0.4 weight percent).

The amount of azide used is advantageously adjusted so that the gel is less than 2 percent. High molecular weight of the ethylene styrene interpolymer used requires less azide than is required by polymers of lower molecular weight.

Visual examination of Transmission Electron Micrographs of samples of the compositions prepared in Example 1 and Comparative Sample A shows that the size of regions of polypropylene phase in the blend with sulfonyl azide is smaller and more continuous than the control sample without sulfonylazide.

EXAMPLE 2

A mixer commercially available from Haake Fusion Co. consisting of a mixer with the trade designation Haake-Buchler Rheomix 3000 mixer with roller style blades, attached to a rheometer with the trade designation Haake-Buchler Rheocord 9000 Torque rheometer. The mixing bowl was heated to 126° C. The mixing speed was set at 20 rpm. ESI 2 (152 g) and an ethylene octene copolymer was commercially available from Dow Chemical Company under the trade designation of Affinity PL 1880 polyolefin plastomers. After 2 minutes, 0.30 g of 4,4'-disulfonylazidophenyl (0.15 weight percent) was added to the mixer and mixed for 1 minute. The temperature of the mixture was raised to 190–200° C. This was done by raising the set temperature to 160° C. and increasing the stirring rate to 75 rpm (revolutions per minute). After 10 minutes, the sample was removed from the mixer bowl.

C.S. C

The method of Ex 2 was repeated except that no 4,4'-disulfonylazidophenyl was used.

EXAMPLE 3

The method of Ex. 2 was repeated except that 148.6 g of ESI-2, 49.5 g of a the HDPE HD30460 M polyethylene, and 0.3 g of 4,4'-disulfonylazidophenyl were used.

C.S. D

The method of Ex 2 was repeated except that 148.6 g of ESI-2 and 49.5 g of the HDPE HD30460 M polyethylene were used.

TABLE 4

Properties of Azide Modified Ethylene Octene Copolymer and Ethylene Styrene Interpolymer Blend

| Sample and Comparative Sample | UST (C) | 0.1 Rad/s Viscosity (poise) | 0.1 Rad/s Viscosity (Pa-s) | Ratio of 0.1 to 100 Rad/s Viscosity |
|---|---|---|---|---|
| C.S. C | 84 | 1.60E05 | 1.60E04 | 7.96 |
| Ex. 2 | 90 | 13.32E05 | 13.32E04 | 65.07 |
| C.S. D | 96 | N/M | N/M | N/M |
| EX. 3 | 110 | N/M | N/M | N/M |

N/M: not measured

The results in Table 4 shows the result of blends of alpha-olefin/vinyl aromatic or hindered aliphatic vinyl monomer interpolymer with polyolefins reacted with and not reacted with poly(sulfonyl azide). This result was obtained with blends of ethylene/styrene interpolymers and either an ethylene/octene polymer or HDPE. The results from C.S. C and Ex.2 indicate the blend using poly(sulfonyl azide) (Ex.2) has higher melt strength (0.1 rad viscosity) and higher shear thinning effect (ratio of 0.1 rad/s to 10 rad/s viscosity) than the sample without poly(sulfonyl azide) (C.S. C)

What is claimed is:

1. A process of preparing a coupled polymer blend comprising heating an admixture containing:
   (1) a polymer blend containing:
      (A) from 1 to 99 weight percent based on entire composition of one or more α-olefin/hindered vinyl monomer substantially random interpolymers, each having been made from monomer components comprising:
         (1) from 0.5 to 65 mole percent of either
            (a) at least one vinyl aromatic monomer, or
            (b) at least one hindered aliphatic vinyl monomer, or
            (c) a combination of at least one vinyl aromatic monomer and at least one hindered aliphatic vinyl monomer; and
         (2) from 35 to 99.5 mole percent of at least one aliphatic α-olefin having from 2 to 20 carbon atoms; and
      (B) from 99 to 1 weight percent of one or more homopolymers of copolymers made from monomer components comprising aliphatic α-olefins having from 2 to 20 carbon atoms, or aliphatic α-olefins having from 2 to 20 carbon atoms and containing polar groups; and
   (2) a coupling amount of at least one poly(sulfonyl azide) to at least the decomposition temperature of the poly (sulfonyl azide) for a period sufficient for decomposition of at least about 80 weight percent of the poly(sulfonyl azide) and sufficient to result in a coupled polymer blend having less than about 2 weight percent gel as measured by ASTM D-2765 Procedure "A".

2. The process of claim 1 wherein in the blend: component (A) is a substantially random interpolymer made from styrene and ethylene, or styrene, ethylene and at least one other α-olefin containing from 3 to 8 carbon atoms; and component (B) is a homopolymer made from ethylene or propylene, or a copolymer made from ethylene and/or propylene and at least other α-olefin containing from 4 to 8 carbon atoms; or a terpolymer of ethylene, propylene and at least one of 4-methyl pentene, butene-1, hexene-1 or octene-1.

3. The process of claim 1 wherein the amount of poly (sulfonyl azide) is from about 0.01 to about 1 weight percent of the blend.

4. The process of claim 1 wherein the coupling agent comprises at least one poly(sulfonyl azide) which has a structure X-R-X wherein each X is $SO_2N_3$ and R represents an unsubstituted or inertly substituted hydrocarbyl, hydrocarbyl ether of silicon-containing group.

5. The process of claim 4 wherein at least one poly (sulfonyl azide) has sufficient carbon, oxygen or silicon, atoms to separate the sulfonyl azide groups sufficiently to permit a facile reaction between the elastomer and the sulfonyl azide.

6. The process of claim 4 wherein at least one poly (sulfonyl azide) has at least 3 but less than 50 carbon, silicon or oxygen atoms between sulfonyl azide groups.

7. The process of claim 4 wherein R includes at least one aryl group between the sulfonyl groups.

8. The process of claim 4 wherein R includes at least two aryl groups or wherein R is one aryl group, and the group has more than one ring.

9. The process of claim 4 wherein the poly(sulfonyl)azide is selected from 1,5-pentane bis(sulfonyl azide), 1,8-octane bis(sulfonyl azide), 1,10-decane bis(sulfonyl azide), 1,10-octadecane bis(sulfonyl azide), 1-octyl-2,4,6-benzene tris (sulfonyl azide), 4,4'-diphenyl ether bis(sulfonyl azide), 1,6-bis(4'-sulfonazidophenyl)hexane, 2,7-naphthalene bis (sulfonyl azide), mixed sulfonyl azides of chlorinated aliphatic hydrocarbons containing an average of from 1 to 8 chlorine atoms and from about 2 to 5 sulfonyl azide groups per molecule, and mixtures thereof.

10. The process of claim 4 wherein the poly(sulfonyl azide) and blend react at a temperature which is at least greater than the first temperature, at least the decomposition temperature of the poly(sulfonyl azide) and greater than about 150° C.

11. The process of claim 4 wherein the poly(sulfonyl azide) and blend are mixed at a first temperature which is at least the melting point of the lowest melting component of the blend and after mixing react at a second temperature which is at least greater than the first temperature, is at least the decomposition temperature of the poly(sulfonyl azide) and is greater than about 185° C.

12. The process of claim 1 additionally comprising steps of calendering, blowing, casting, injection molding, compression molding, extrusion, blow molding, foaming, or spinning.

13. A composition comprising a reaction product obtained by heating an admixture containing:
(1) a polymer blend containing:
   (A) from 1 to 99 weight percent of one or more α-olefin/hindered vinyl monomer substantially random interpolymers, each having been made from monomer components comprising:
      (1) from 0.5 to 65 mole percent of either
         (a) at least one vinyl aromatic monomer, or
         (b) at least one hindered aliphatic vinyl monomer, or
         (c) a combination of at least one vinyl aromatic monomer and at least one hindered aliphatic vinyl monomer; and
      (2) from 35 to 99.5 mole percent of at least one aliphatic α-olefin having from 2 to 20 carbon atoms; and
   (B) from 99 to 1 weight percent of one or more homopolymers or copolymers made from monomer components comprising aliphatic α-olefins having from 2 to 20 carbon atoms, or aliphatic α-olefins having from 2 to 20 carbon atoms and containing polar groups; and
(2) a coupling amount at least one poly(sulfonyl azide) to at least the decomposition temperature of the poly(sulfonyl azide) for a period sufficient for decomposition of at least about 80 weight percent of the poly(sulfonyl azide) and sufficient to result in a coupled polymer blend having less than about 2 weight percent gel as measured by ASTM D-2764 Procedure "A".

14. An article which comprises a composition of claim 13.

15. The article of claim 14 wherein the article is formed from a melt of the composition of claim 13.

16. The article of claim 14 which is a calendared, cast and blown sheet, film, compression and injection molded part, fiber, modifier for bitumen or asphalt compositions, or a component in a hot melt or pressure sensitive adhesive system.

17. A foam formed from a foam forming composition comprising the composition of claim 13.

18. The foam of claim 17 wherein the foam forming composition additionally comprises at least one blowing agent.

19. The process of formation of the article of claim 14 by calendering, blowing, casting, injection molding, compression molding, extrusion, blow molding, foaming, or spinning a composition of claim 13.

20. The process of claim 1 wherein the coupled polymer blend has either a higher melt viscosity measured at 0.1 rad/sec or a lower melt viscosity measured at 100 rad/sec than that of the same polymer blend which has not been treated with the coupling agent but has been subjected to the same shear and thermal history.

* * * * *